(12) United States Patent
Zhu et al.

(10) Patent No.: US 9,230,630 B2
(45) Date of Patent: Jan. 5, 2016

(54) PHYSICALLY UNCLONABLE FUNCTION BASED ON THE INITIAL LOGICAL STATE OF MAGNETORESISTIVE RANDOM-ACCESS MEMORY

(71) Applicant: QUALCOMM Incorporated, San Diego, CA (US)

(72) Inventors: Xiaochun Zhu, San Diego, CA (US); Steven M. Millendorf, San Diego, CA (US); Xu Guo, San Diego, CA (US); David M. Jacobson, San Diego, CA (US); Kangho Lee, San Diego, CA (US); Seung H. Kang, San Diego, CA (US); Matthew Michael Nowak, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 137 days.

(21) Appl. No.: 14/072,599

(22) Filed: Nov. 5, 2013

(65) Prior Publication Data

US 2015/0071430 A1 Mar. 12, 2015

Related U.S. Application Data

(60) Provisional application No. 61/875,608, filed on Sep. 9, 2013.

(51) Int. Cl.
*G11C 11/16* (2006.01)
*H04L 9/30* (2006.01)
*H04L 9/08* (2006.01)
*H04L 9/32* (2006.01)

(52) U.S. Cl.
CPC .......... *G11C 11/1673* (2013.01); *H04L 9/0866* (2013.01); *H04L 9/30* (2013.01); *H04L 9/3278* (2013.01)

(58) Field of Classification Search
CPC .............................. H04L 9/30; G11C 11/1673
See application file for complete search history.

(56) References Cited

U.S. PATENT DOCUMENTS 6,958,927 B1 * 10/2005 Nguyen et al. ................ 365/158
8,159,866 B2    4/2012 Apalkov et al.
8,368,421 B2    2/2013 Gibson
(Continued)

FOREIGN PATENT DOCUMENTS

WO  WO-2004114122 A2  12/2004
WO  WO-2009024913 A2   2/2009

OTHER PUBLICATIONS

International Search Report and Written Opinion—PCT/US2014/054086—ISA/EPO—Jan. 8, 2015.

*Primary Examiner* — Jung Kim
*Assistant Examiner* — Tri Tran
(74) *Attorney, Agent, or Firm* — Loza & Loza, LLP

(57) ABSTRACT

One feature pertains to a method for implementing a physically unclonable function (PUF). The method includes providing an array of magnetoresistive random access memory (MRAM) cells, where the MRAM cells are each configured to represent one of a first logical state and a second logical state. The array of MRAM cells are un-annealed and free from exposure to an external magnetic field oriented in a direction configured to initialize the MRAM cells to a single logical state of the first and second logical states. Consequently, each MRAM cell has a random initial logical state of the first and second logical states. The method further includes sending a challenge to the MRAM cell array that reads logical states of select MRAM cells of the array, and obtaining a response to the challenge from the MRAM cell array that includes the logical states of the selected MRAM cells of the array.

30 Claims, 11 Drawing Sheets

(56) References Cited

U.S. PATENT DOCUMENTS

| | | | |
|---|---|---|---|
| 2005/0216244 A1* | 9/2005 | Nahas | 703/13 |
| 2007/0279969 A1* | 12/2007 | Gabelich | 365/158 |
| 2012/0066571 A1* | 3/2012 | Marinet | 714/773 |
| 2012/0106235 A1 | 5/2012 | Christensen et al. | |
| 2012/0153413 A1 | 6/2012 | Xi et al. | |
| 2013/0129083 A1 | 5/2013 | Fujino | |
| 2013/0134534 A1 | 5/2013 | Sbiaa et al. | |
| 2013/0194863 A1 | 8/2013 | Zhou et al. | |

* cited by examiner

PHYSICALLY UNCLONABLE FUNCTION BASED ON THE INITIAL LOGICAL STATE OF MAGNETORESISTIVE RANDOM-ACCESS MEMORY

CLAIM OF PRIORITY

The present application for patent claims priority to U.S. Provisional Patent Application No. 61/875,608 entitled "PHYSICALLY UNCLONABLE FUNCTION BASED ON THE INITIAL LOGICAL STATE OF MAGNETORESISTIVE RANDOM-ACCESS MEMORY" filed Sep. 9, 2013, the entire disclosure of which is hereby expressly incorporated by reference herein.

BACKGROUND

1. Field

Various features relate to physically unclonable functions (PUFs), and in particular to PUFs based on the initial logic states of an array of magnetoresistive random-access memory (MRAM) cells.

2. Background

An on-chip PUF is a chip-unique challenge-response mechanism exploiting manufacturing process variations inside integrated circuits (ICs). When a physical stimulus (i.e., challenge) is applied to the PUF, the PUF generates a response in an unpredictable but repeatable way due to the complex interaction of the stimulus with the physical microstructure of the device employing the PUF. This exact microstructure depends on physical factors introduced during manufacture of the device employing the PUF, which are unpredictable. The PUF's "unclonability" means that each device employing the PUF has a unique and unpredictable way of mapping challenges to responses, even if one device is manufactured with the same process as another seemingly identical device. Thus, it is practically infeasible to construct a PUF with the same challenge-response behavior as another device's PUF because exact control over the manufacturing process is infeasible.

MRAM is a non-volatile random-access memory that, unlike conventional RAM, stores data not as electric charge but instead as electron spin within magnetic storage elements. FIG. 1, comprising FIGS. 1A and 1B, illustrates a schematic diagram of at least a portion of a spin transfer torque (STT) MRAM circuit cell 100 found in the prior art. The MRAM cell 100 shown in FIGS. 1A and 1B is an example of an "in-plane" STT MRAM cell. The MRAM cell 100 includes a free layer 102, a reference layer (also known as "pinned reference layer") 104, a tunnel junction layer 106, and an anti-ferromagnetic (AFM) pinning layer 108. The free layer 102 is a ferromagnetic layer whose magnetic polarity is not fixed but is instead free to change direction in response to an external magnetic field (not shown). The reference layer 104 includes a first ferromagnetic layer 105 and a second ferromagnetic layer 107 that have opposite magnetic polarities. By contrast to the free layer 102, the reference layer 104 has a magnetic polarity that is fixed such that the magnetic polarities of the first and second ferromagnetic layers 105, 107 do not change direction in the presence of the aforementioned external magnetic field. The AFM pinning layer 108 is an anti-ferromagnetic layer that controls the magnetic polarities of the reference layer 106.

Situated in between the free layer 102 and the reference layer's first ferromagnetic layer 104 is the tunnel junction layer 106. The tunnel junction layer 106 is made of a very thin insulating material, such as magnesium oxide (MgO). The tunnel junction layer 106 is so thin that electrons may actually flow through (e.g., tunnel through) the layer 106 despite the layer 106 being an insulator. The magnetic polarity direction of the free layer 102 relative to the first ferromagnetic layer 105 (e.g., parallel to each other or antiparallel to each other) represents one of two different logical data bit states (e.g. data bit "1" or data bit "0"). In the example illustrated in FIG. 1A, the parallel orientation is shown with the free layer 102 having a magnetic polarity direction that is the same as the magnetic polarity direction of the first ferromagnetic layer 105. By contrast, FIG. 1B illustrates the antiparallel orientation with the free layer 102 having a magnetic polarity direction that is the opposite of the magnetic polarity direction of the first ferromagnetic layer 105.

A signal line voltage $V_{SL}$ applied to the MRAM cell 100 controls the flow of current $I_{SL}$ through the MRAM cell 100. For example, applying a voltage $V_{SL}$ that exceeds the transition voltage $V_T$ of the cell 100 causes the current $I_{SL}$ to flow in the direction shown in FIG. 1A and also causes the magnetic polarity of the free layer 102 to change direction into a parallel orientation. That is, the magnetic polarity direction of the free layer 102 is parallel to the magnetic polarity of the first ferromagnetic layer 105. To change the magnetic polarity direction of the free layer 102 back to an antiparallel orientation, a signal line voltage $V_{SL}$ that exceeds $V_T$ is applied in the orientation shown in FIG. 1B to cause the current $I_{SL}$ to flow in the opposite direction. In one example, the parallel state may be considered the first logical state representing a data bit "0," and the antiparallel state may be considered the second logical state representing a data bit "1."

FIG. 2 shows a top perspective schematic view of a portion of the in-plane MRAM cell 100 found in the prior art that is undergoing a manufacturing process step. During manufacture of the cell 100, an annealing process step is performed that initializes all of the MRAM cells 100 in the MRAM cell array (array not shown) to a first logical state, e.g., state "1." Specifically, an external magnetic field along the MRAM cell's "easy axis" is applied during the annealing process step to initialize the MRAM cells 100 of the array. The "easy axis" is the preferred/relaxed direction of an MRAM cell free layer's magnetic polarity. For example, the easy axis of the in-plane MRAM cell 100 shown in FIG. 2 is the free layer's 102 long axis 203, which is parallel to the x-axis labeled in FIG. 2. Application of the annealing process step in the presence of the external magnetic field causes all of the MRAM cells 100 in the array to have a homogenous state (e.g., all in the first logical "1" state) prior to any logical state transition (as described with reference to FIGS. 1A and 1B) that may occur during typical use.

FIG. 3 shows a top perspective schematic view of a portion of a perpendicular MRAM cell 300 found in the prior art. Like the in-plane MRAM cell 100 shown in FIGS. 1A and 1B, the perpendicular MRAM cell 300 of FIG. 3 includes a free layer 302 and a reference layer 304. The relative orientation (parallel or antiparallel) of the magnetic polarity of the free layer 302 with respect to the reference layer 304 dictates the logical state (e.g., logical "0" or "1") of the MRAM cell 300. The magnetic polarities of the perpendicular MRAM cell's 300 free layer 302 and reference layer 304 are typically oriented along a direction parallel to its perpendicular axis 303 (e.g., parallel to the y-axis shown in FIG. 3). The perpendicular MRAM cell 300 shown is similarly undergoing an annealing process that initializes the MRAM cell 300 (and all other MRAM cells in the array (array not shown)) to a first logical state, e.g., state "1." An external magnetic field is applied during the annealing process step along the MRAM cell's 300 easy axis to initialize the MRAM cells 300 of the array. In the example shown in FIG. 3, the easy axis of the perpendicular MRAM cell 300 is the perpendicular axis 303, which is parallel to the y-axis shown in FIG. 3. Application of the annealing process step in the presence of the external magnetic field causes all of the MRAM cells 300 in the array to have a homogenous state (e.g., all in the first logical "1" state) prior to any logical state transition (as described with reference to FIGS. 1A and 1B) that may occur during typical use.

There exists a need for methods and apparatuses that implement PUFs based on MRAM cells. Specifically, there exists a need to provide methods and apparatuses that may implement PUFs based on the initial logic states of MRAM cell arrays. Such MRAM based PUFs may provide a secure means to uniquely identify electronic devices, such as integrated circuits, and/or provide secure cryptographic keys for cryptographic security algorithms.

SUMMARY

One feature provides a method for implementing a physically unclonable function (PUF). The method comprises providing an array of magnetoresistive random access memory (MRAM) cells, the MRAM cells each configured to represent one of a first logical state and a second logical state, the array of MRAM cells being un-annealed and free from exposure to an external magnetic field oriented in a direction configured to initialize the MRAM cells to a single logical state of the first and second logical states, and consequently each MRAM cell having a random initial logical state of the first and second logical states, sending a challenge to the MRAM cell array that reads logical states of select MRAM cells of the array, and obtaining a response to the challenge from the MRAM cell array that includes the logical states of the selected MRAM cells of the array. According to one aspect, the MRAM cells lack an anti-ferromagnetic (AFM) pinning layer. According to another aspect, during manufacture the MRAM cells have been temporarily exposed to an orthogonal external magnetic field oriented in an orthogonal direction to an easy axis of a free layer of the MRAM cells to place the MRAM cells in a neutral logical state that is not the first logical state or the second logical state.

According to one aspect, during manufacture the orthogonal external magnetic field is removed causing the MRAM cells to settle into the random initial logical states. According to another aspect, the MRAM cells of the array are in-plane MRAM cells, the easy axis is a long axis of the free layer of the MRAM cells, and the orthogonal external magnetic field is oriented in a direction that is parallel to a short axis of the free layer. According to yet another aspect, the MRAM cells of the array are in-plane MRAM cells, the easy axis is a long axis of the free layer of the MRAM cells, and the orthogonal external magnetic field is oriented in a direction that is orthogonal to both a short axis of the free layer and the long axis of the free layer.

According to one aspect, the MRAM cells of the array are perpendicular MRAM cells, and the easy axis is a perpendicular axis of the free layer of the MRAM cells. According to another aspect, the logical states of the MRAM cells of the array serve as a cryptographic key that uniquely identifies an electronic device. According to yet another aspect, the logical states of the MRAM cells of the array are utilized by a cryptographic security algorithm. According to another aspect, the challenge includes MRAM cell address information, and the response includes data bit information of MRAM cells corresponding to the MRAM cell address information.

Another feature provides an apparatus for implementing a physically unclonable function (PUF). The apparatus comprises an array of magnetoresistive random access memory (MRAM) cells, the MRAM cells each configured to represent one of a first logical state and a second logical state, the array of MRAM cells being un-annealed and free from exposure to an external magnetic field oriented in a direction configured to initialize the MRAM cells to a single logical state of the first and second logical states, and consequently each MRAM cell having a random initial logical state of the first and second logical states, and a processing circuit communicatively coupled to the array of MRAM cells and configured to send a challenge to the MRAM cell array that reads logical states of select MRAM cells of the array, and obtain a response to the challenge from the MRAM cell array that includes the logical states of the selected MRAM cells of the array.

Another feature provides an apparatus for implementing a physically unclonable function (PUF), where the apparatus comprises an array of magnetoresistive random access memory (MRAM) cells, the MRAM cells each configured to represent one of a first logical state and a second logical state, the array of MRAM cells being un-annealed and free from exposure to an external magnetic field oriented in a direction configured to initialize the MRAM cells to a single logical state of the first and second logical states, and consequently each MRAM cell having a random initial logical state of the first and second logical states, a means for sending a challenge to the MRAM cell array that reads logical states of select MRAM cells of the array, and a means for obtaining a response to the challenge from the MRAM cell array that includes the logical states of the selected MRAM cells of the array.

Another feature provides a computer-readable storage medium having instructions stored thereon for implementing a physically unclonable function (PUF), the instructions, which when executed by at least one processor, causes the processor to send a challenge to an array of magnetoresistive random access memory (MRAM) cells that reads logical states of select MRAM cells of the array, the MRAM cells each configured to represent one of a first logical state and a second logical state, the array of MRAM cells being un-annealed and free from exposure to an external magnetic field oriented in a direction configured to initialize the MRAM cells to a single logical state of the first and second logical states, and wherein each MRAM cell has a random initial logical state of the first and second logical states, and obtain a response to the challenge from the MRAM cell array that includes the logical states of the selected MRAM cells of the array.

BRIEF DESCRIPTION OF DRAWINGS

FIG. 1, comprising

DETAILED DESCRIPTION

In the following description, specific details are given to provide a thorough understanding of the various aspects of the disclosure. However, it will be understood by one of ordinary skill in the art that the aspects may be practiced without these specific details. For example, circuits may be shown in block diagrams in order to avoid obscuring the aspects in unnecessary detail. In other instances, well-known circuits, structures and techniques may not be shown in detail in order not to obscure the aspects of the disclosure.

The word "exemplary" is used herein to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage, or mode of operation.

Overview

Methods and apparatuses are described herein that implement PUFs based on MRAM circuit cell arrays. Specifically, the PUFs are implemented based on the initial random logic states of MRAM circuit cells that arise due to small physical MRAM cell variation created by the manufacturing process. The PUF-challenge responses generated by the MRAM based PUFs may be used to uniquely identify the electronic devices and/or integrated circuits having the MRAM based PUFs. Alternatively, the responses generated by the PUFs may be used as secure cryptographic keys for cryptographic security algorithms.

Exemplary MRAM Based PUFs and Methods for Implementing the Same

Figure 4:
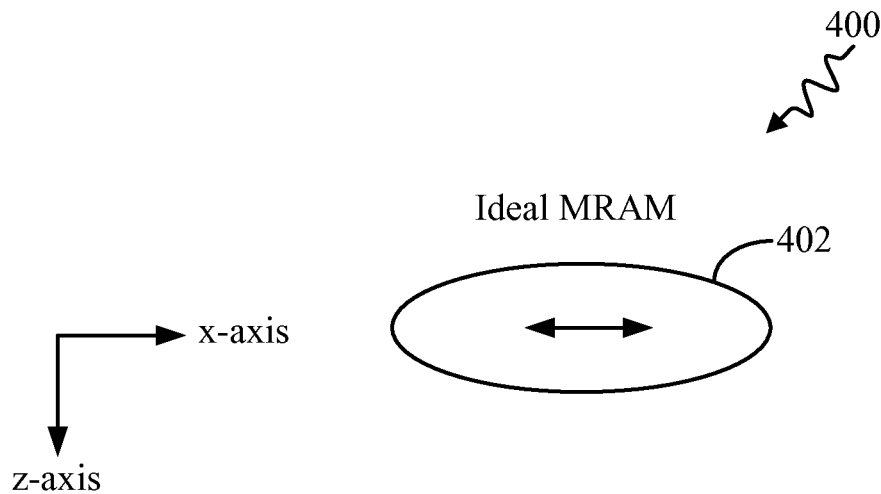
FIG. 4 illustrates a top schematic view of an ideal in-plane MRAM circuit cell.
Figure 5:
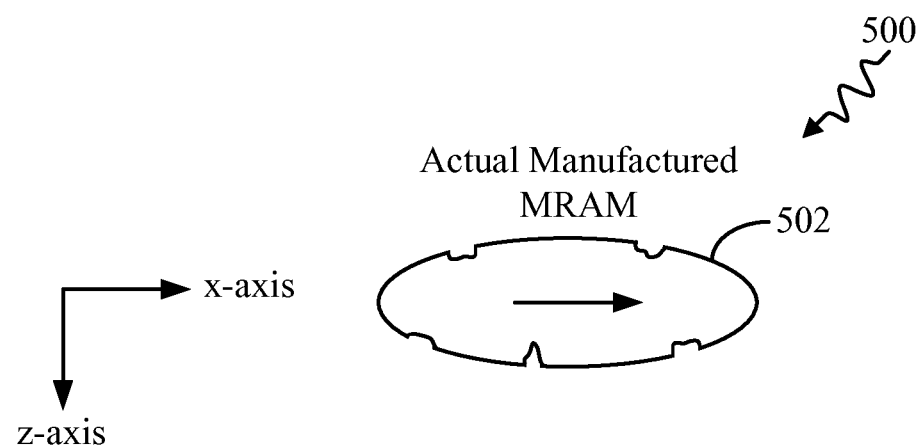
FIG. 5 illustrates a top schematic view of a manufactured in-plane MRAM circuit cell.

FIGS. 4 and 5 illustrate top schematic views of in-plane MRAM circuit cells 400, 500 according to one aspect of the disclosure. Specifically, FIG. 4 illustrates a theoretically ideal MRAM cell 400 that is manufactured without imperfection. For example, the ideal MRAM cell 400 is smooth, elliptical, and symmetrical; it does not have any rough edges or dents. As a result, in the absence of an external magnetic field the ideal MRAM cell 400 has an equal probability of having its free layer's 402 magnetic polarity settle to either direction of its long axis. That is, the magnetic polarity of the free layer 402 may point towards either the positive x-axis or the negative x-axis, and consequently it has an equal probability of settling to a first logical state (e.g., "0") or a second logical state (e.g., "1"). The same concept is true too for a perfect perpendicular MRAM cell: in the absence of an external magnetic field the ideal perpendicular MRAM cell has an equal probability of having its free layer's magnetic polarity settle to either direction of its perpendicular axis.

By contrast, FIG. 5 illustrates a more realistically manufactured in-plane MRAM cell 500 that does have imperfections. For example, the manufactured MRAM cell 500 is not perfectly symmetrical and may have rough edges, dents, and other imperfections. As a result, the manufactured MRAM cell 500 is biased such that in the absence of an external magnetic field its free layer's 502 magnetic polarity consistently settles initially to one direction of its long axis versus the other. That is, the magnetic polarity of the free layer 502 initially points towards one of the positive x-axis or the negative x-axis more consistently than the other. Consequently, the manufactured MRAM cell 500 has a greater probability of initially settling to a first logical state (e.g., "0") or a second logical state (e.g., "1"). The same concept is true too for a manufactured, imperfect perpendicular MRAM cell: in the absence of an external magnetic field the imperfect perpendicular MRAM cell consistently settles initially to one direction of its perpendicular axis than the other.

MRAM based PUFs are described herein that take advantage of the aforementioned manufacturing based MRAM cell variation within an MRAM array to, for example, uniquely and distinctively identify one MRAM cell array (or an electronic device having the MRAM cell array) versus another even if the arrays are attempted to be manufactured the same.

Remove External Magnetic Field Annealing Manufacturing Process Step

Figure 2:
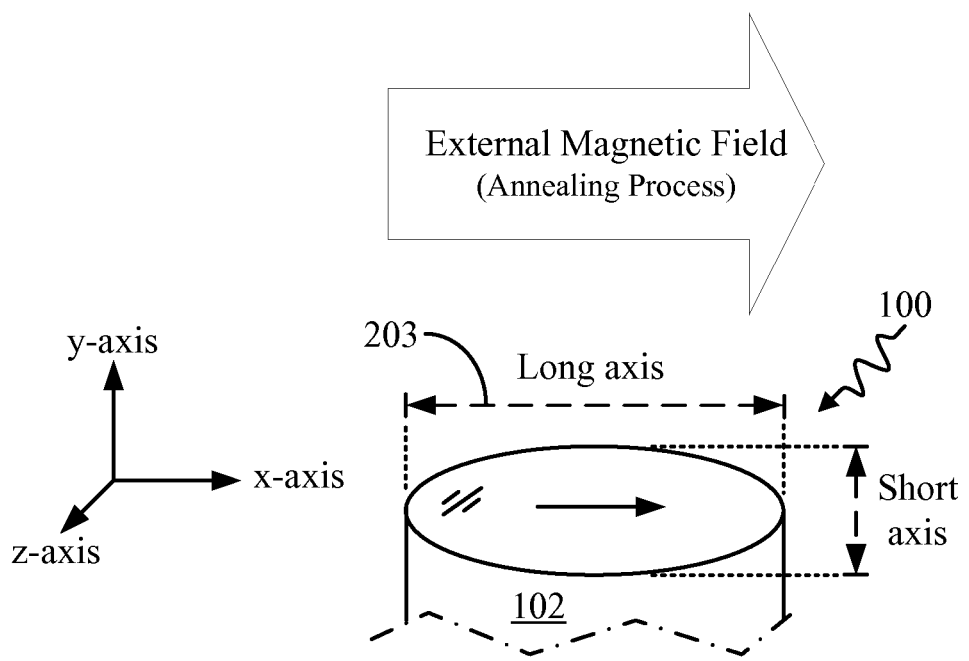
FIG. 2 shows a top perspective schematic view of a portion of the in-plane MRAM cell found in the prior art that is undergoing a manufacturing process step.
Figure 3:
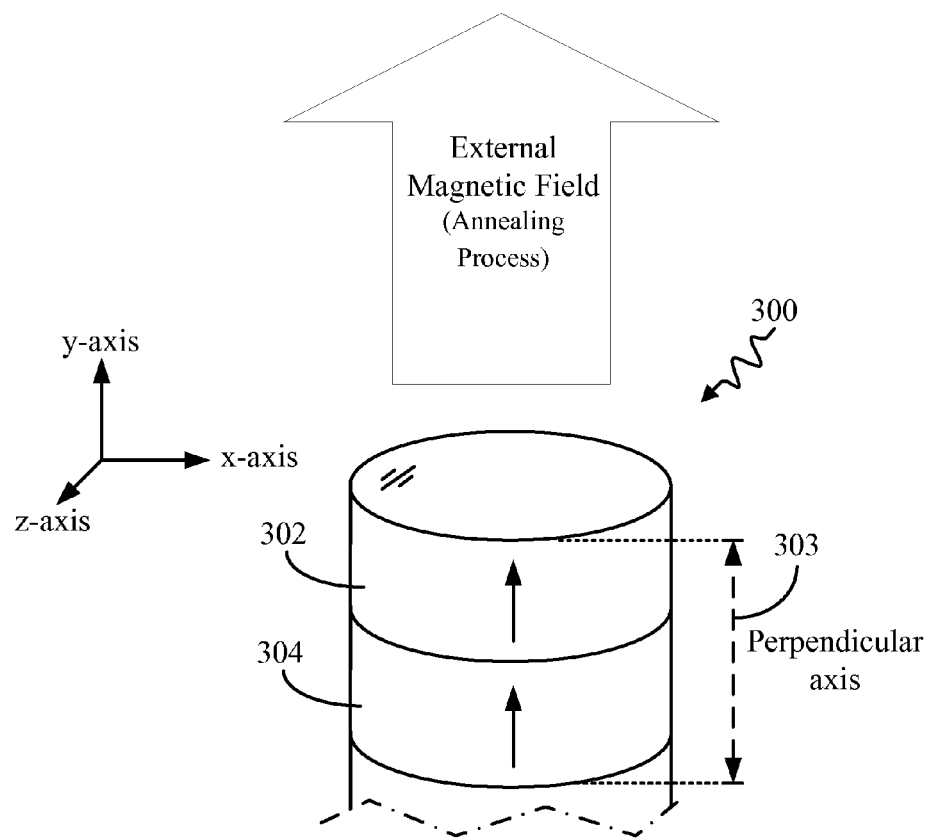
FIG. 3 shows a top perspective schematic view of a portion of a perpendicular MRAM cell found in the prior art.
Figure 6:
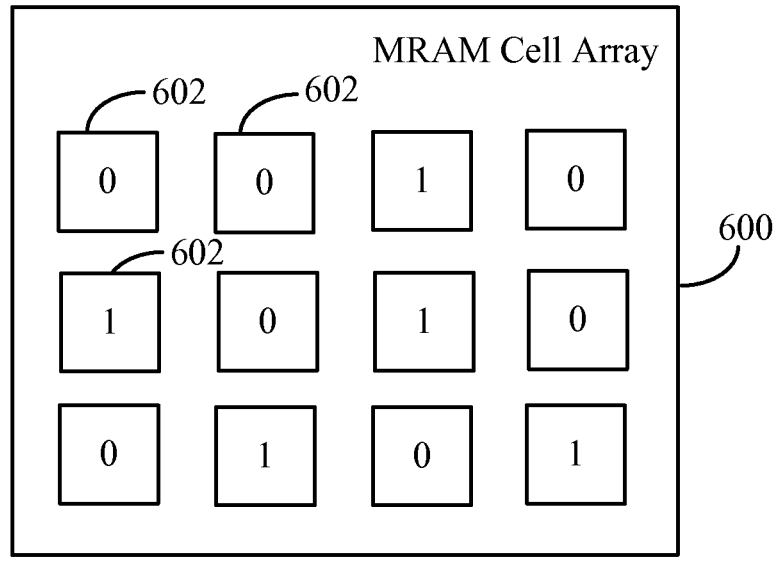
FIG. 6 illustrates a schematic diagram of an MRAM cell array that is un-annealed.

FIG. 6 illustrates a schematic diagram of an MRAM cell array 600 according to one aspect of the disclosure. Specifically, FIG. 6 shows the initial logical state values of an un-annealed MRAM cell array 600 (i.e., an MRAM cell array 600 that has not undergone the annealing process having the external magnetic field shown and described in FIGS. 2 and 3). Consequently, the individual MRAM cells 602 of the array 600 initially settle to their biased logical state values (i.e., either "0" or "1") due to the manufacturing imperfections/defects described above with respect to FIG. 5. Referring to FIG. 6, since these initial logical state values are based on random manufacturing differences among cells there is no way to predict which MRAM cells 602 will have what logical values. Even if the array 600 is manufactured multiple times to be the same, each array will exhibit MRAM cells having different manufacturing imperfections having different initial logical state biases. Thus, the initial logical state values (e.g., those shown in FIG. 6) are random and unique to each MRAM cell array 600 and therefore may be used as a basis for a PUF. For example the random and unique initial logical state values may be used to generate a cryptographic security key and/or serve as a unique device/integrated circuit identifier that houses the MRAM cell array 600.

Removal of AFM Pinning Layer

Figures 1A, 1B:
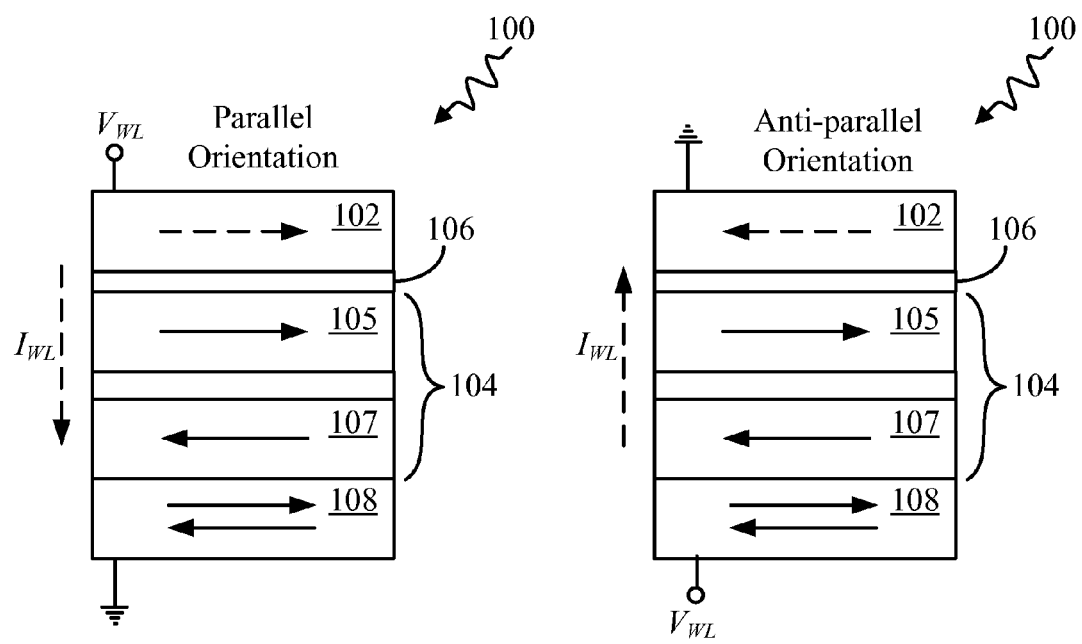
FIGS. 1A and 1B, illustrates a schematic diagram of at least a portion of a spin transfer torque (STT) MRAM circuit cell found in the prior art.
Figure 7:
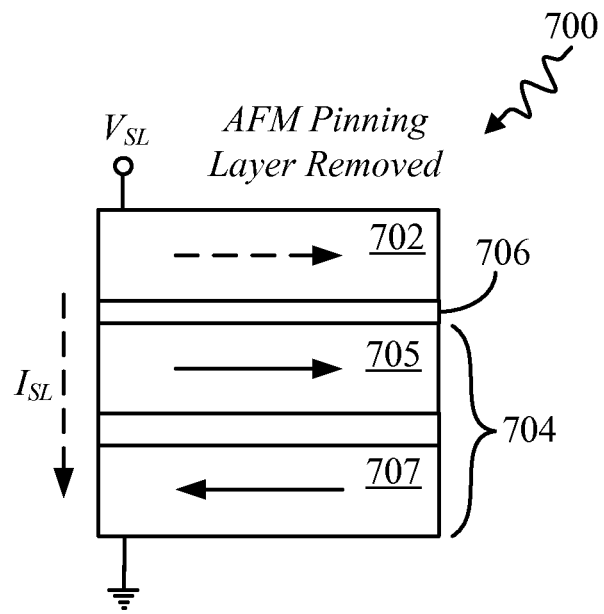
FIG. 7 illustrates a schematic diagram of an MRAM cell.

FIG. 7 illustrates a schematic diagram of an MRAM cell 700 according to another aspect of the disclosure. The MRAM cell 700 includes the free layer 702, the reference layer 704, and the tunnel junction layer 706. The reference layer 704 includes the first ferromagnetic layer 705 and the second ferromagnetic layer 707. Notably, the MRAM cell 700 does not have an AFM pinning layer 108 (see FIGS. 1A and 1B). Referring to FIG. 7, since the MRAM cell 700 lacks the AFM pinning layer the magnetic polarities of the first and second ferromagnetic layers 705, 707—although always opposite each other—may not have to be pinned to one particular orientation (e.g., they may point either left or right in FIG. 7). The magnetic polarity of the free layer 702 may still be antiparallel or parallel to the magnetic polarity of the first ferromagnetic layer 705 though despite the missing AFM pinning layer. Removing the AFM pinning layer may help reduce costs and simplify manufacturing.

Apply Orthogonal External Magnetic Field During Manufacturing

Figure 8:
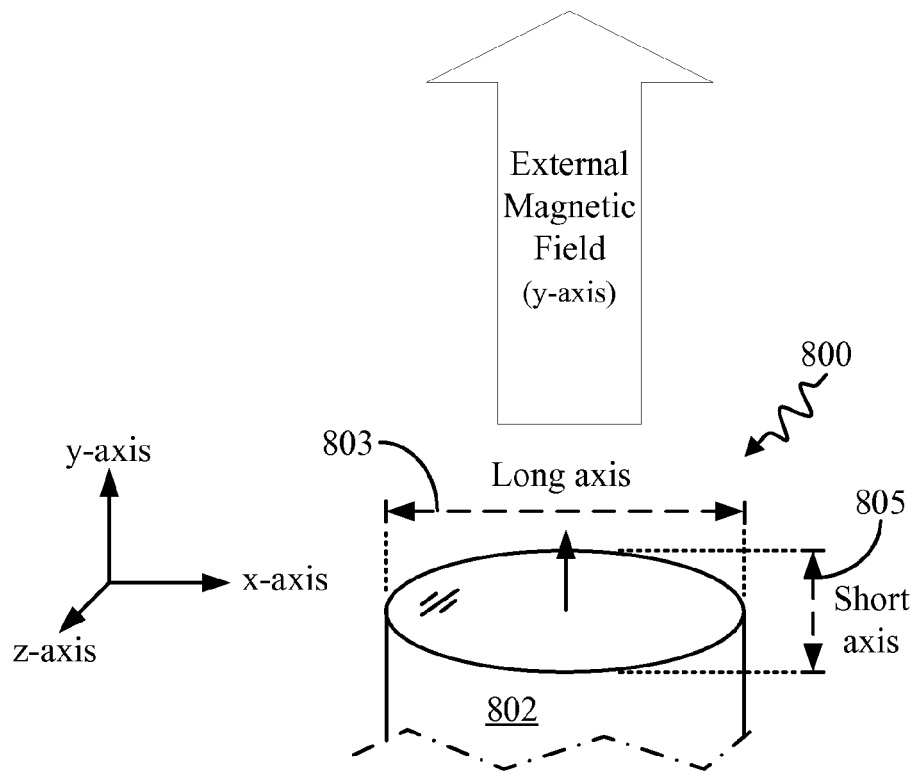
FIG. 8 shows a top perspective schematic view of an in-plane MRAM cell that is part of an MRAM cell array.

FIG. 8 shows a top perspective schematic view of an in-plane MRAM cell 800 that may be part of an MRAM cell array according to one aspect of the disclosure. During MRAM cell array manufacture, an external magnetic field is applied to the MRAM cell 800 (as well as a plurality of other similar MRAM cells within the MRAM cell array (array not shown)) in a direction that is orthogonal to the easy axis (e.g., long axis 803, which is parallel to the x-axis shown in FIG. 8) of the MRAM cell's free layer 802. In the illustrated example, the external magnetic field is oriented parallel to the y-axis, which is orthogonal to the easy axis of the free layer 802. Alternatively, the external magnetic field may instead be oriented parallel to the short axis 805 of the free layer 802 (the short axis 805 being parallel to the z-axis shown in FIG. 8), which is also orthogonal to the easy axis of the free layer 802. Application of the external magnetic field temporarily causes the MRAM cell array's free layers to have a magnetic polarity that is aligned with the external magnetic field's direction, and thus also be orthogonal to the free layer's 802 long axis. While in such a state, the MRAM cell 800 is in a neutral logical state that is neither a first logical "0" state or a second logical "1" state.

Upon removal of the orthogonal external magnetic field, the MRAM cell 800 will randomly settle to one of the two possible logical states (e.g., first logical state "0" or second logical state "1"). The specific logical state each MRAM cell 800 settles to will be controlled by the individual bias each MRAM cell 800 has towards a certain logical state value. Thus, if the manufacturing imperfections of the MRAM cell 800 cause the cell 800 to have a bias towards the first logical state "0," then upon removal of the orthogonal external magnetic field the MRAM cell 800 will naturally settle to the first logical state "0." Since the application and removal of the orthogonal external magnetic field is performed during manufacture, the MRAM cell array 800 is initialized to have random and unique logical state values before the MRAM cells are written to using standard signal line voltages $V_{SL}$ and currents $I_{SL}$ that change the free layer's 802 orientation.

Figure 9:
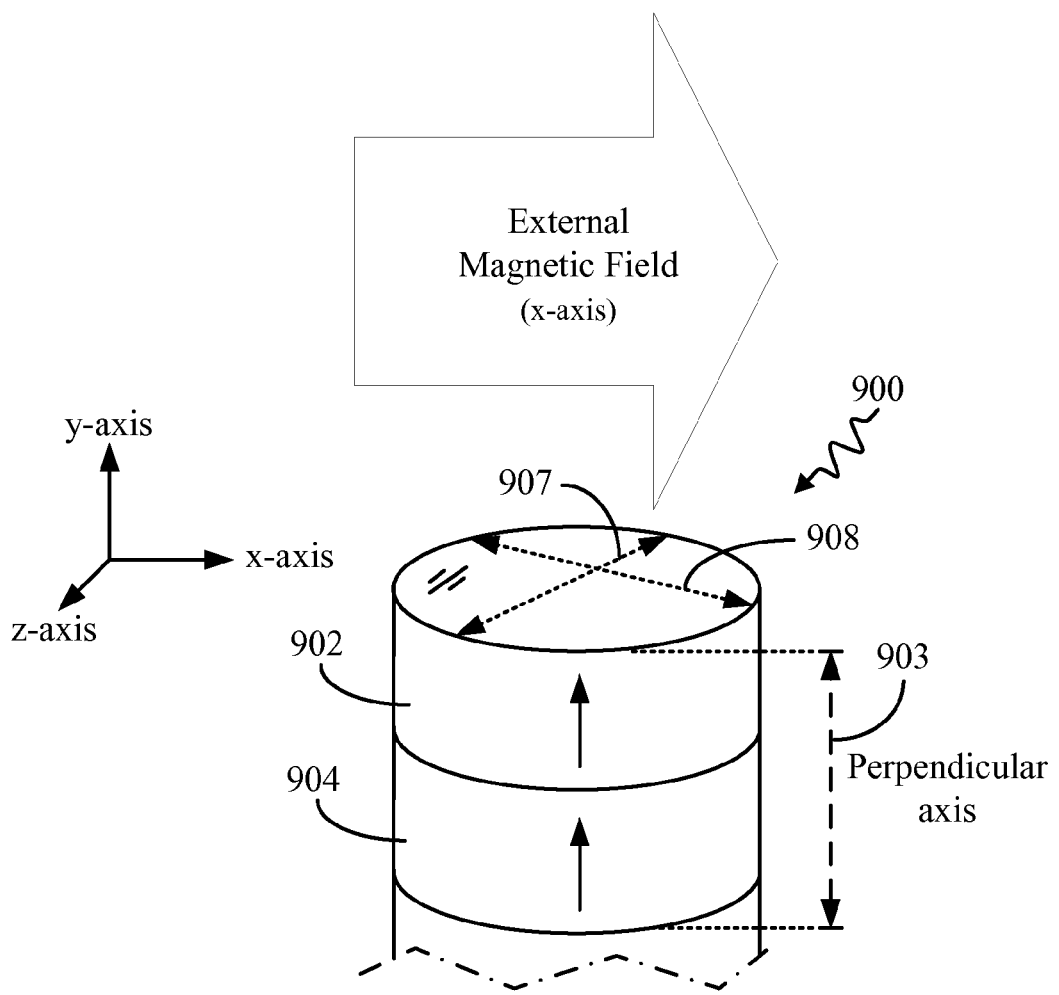
FIG. 9 illustrates a top perspective schematic view of a perpendicular MRAM cell that is part of an MRAM cell array.

FIG. 9 illustrates a top perspective schematic view of a perpendicular MRAM cell 900 that may be part of an MRAM cell array according to one aspect of the disclosure. Like the in-plane MRAM cell 800 shown and described above with reference to FIG. 8, the perpendicular MRAM cell 900 may also be subjected to an external magnetic field in a direction that is orthogonal to the easy axis of the MRAM cell's free layer 902. For the case of the perpendicular MRAM cell 900, the external magnetic field may be oriented parallel to the x-axis, which is orthogonal to the easy axis (i.e., perpendicular axis 903) of the free layer 902. The external magnetic field may also be oriented parallel to the z-axis, which is also orthogonal to the x-axis. In fact, the external magnetic field may have directional components in both the x-axis and z-axis, and thus be parallel, for example, to the directions 907, 908 shown in FIG. 9, and still be orthogonal to the perpendicular axis 903. Application of the external magnetic field temporarily causes the MRAM cell array's free layers to have a magnetic polarity that is aligned with the external magnetic field's direction, and thus also be orthogonal to the free layer's perpendicular axis 903. While in such a state, the MRAM cell 900 is in a neutral logical state that is neither a first logical "0" state or a second logical "1" state.

Upon removal of the orthogonal external magnetic field, the MRAM cell 900 will randomly settle to one of the two possible logical states (e.g., first logical state "0" or second logical state "1"). The specific logical state each MRAM cell 900 settles to will be controlled by the individual bias each MRAM cell 900 has towards a certain logical state value. Thus, if the manufacturing imperfections of the MRAM cell 900 cause the cell 900 to have a bias towards the first logical state "0," then upon removal of the orthogonal external magnetic field the MRAM cell 900 will naturally settle to the first logical state "0." Since the application and removal of the orthogonal external magnetic field is performed during manufacture, the MRAM cell array 900 is initialized to have random and unique logical state values before the MRAM cells are written to using standard signal line voltages $V_{SL}$ and currents $I_{SL}$ that change the free layer's 902 orientation.

In this fashion, upon removal of the orthogonal external magnetic field each of the MRAM cells with the MRAM cell array will be initialized to settle to their own biased logical state value. These initial logical state values are random and unique to each MRAM cell array and therefore may be used as a basis for a PUF. For example the random and unique initial logical state values may be used to generate a cryptographic security key and/or serve as a unique device/integrated circuit identifier that houses the MRAM cell array.

Figure 10:
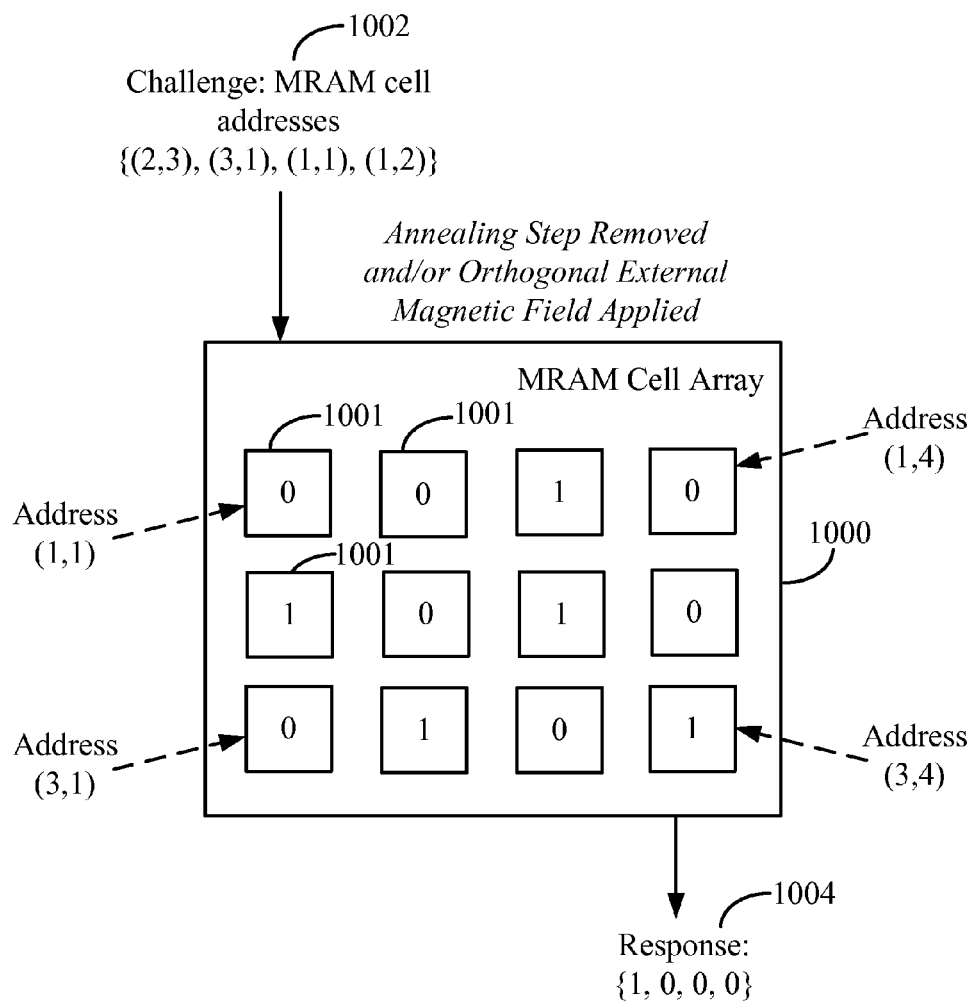
FIG. 10 illustrates an exemplary challenge-response system using the MRAM based PUF.

FIG. 10 illustrates an exemplary challenge-response system using the MRAM based PUF according to one aspect. A challenge 1002 may be received at the MRAM based PUF that includes MRAM cell address information. That is, the challenge 1002 may specify which MRAM cell address locations are to be read. In the illustrated example, the challenge 1002 specifies that address locations {(2,3), (3,1), (1,1), (1,2)} of the MRAM array 1000 are to be read. The MRAM array 1000 includes a plurality of MRAM cells 1001 that have random initial logic states because the MRAM array 1000 has at least one of (a) skipped the magnetic field annealing manufacturing step described with reference to FIGS. 2 and 3, and/or (b) undergone the orthogonal external magnetic field manufacturing process step described with reference to FIGS. 8 and 9. The MRAM cells 1001 may also lack an AFM pinning layer and have the structure of the MRAM cell 700 described with referenced to FIG. 7.

In response 1004 to the challenge 1002, the logical states of the MRAM cell address locations are read/retrieved. The resulting logical states read from the MRAM cells 1001 is the response 1004 to the challenge 1002 issued. The resulting logical states are unique in that other MRAM cell arrays, even if attempted to be manufactured identical, will vary in their logical state responses given the same challenge due to uncontrollable manufacturing variation.

As one example, the response 1004 may be used as a cryptographic key that uniquely identifies an electronic device and/or the integrated circuit that houses the MRAM cell array 1000. As another example, the response 1004 may be used as a random, unique key in a cryptographic security algorithm, such as a private key in a public-private key encryption algorithm.

Figure 11:
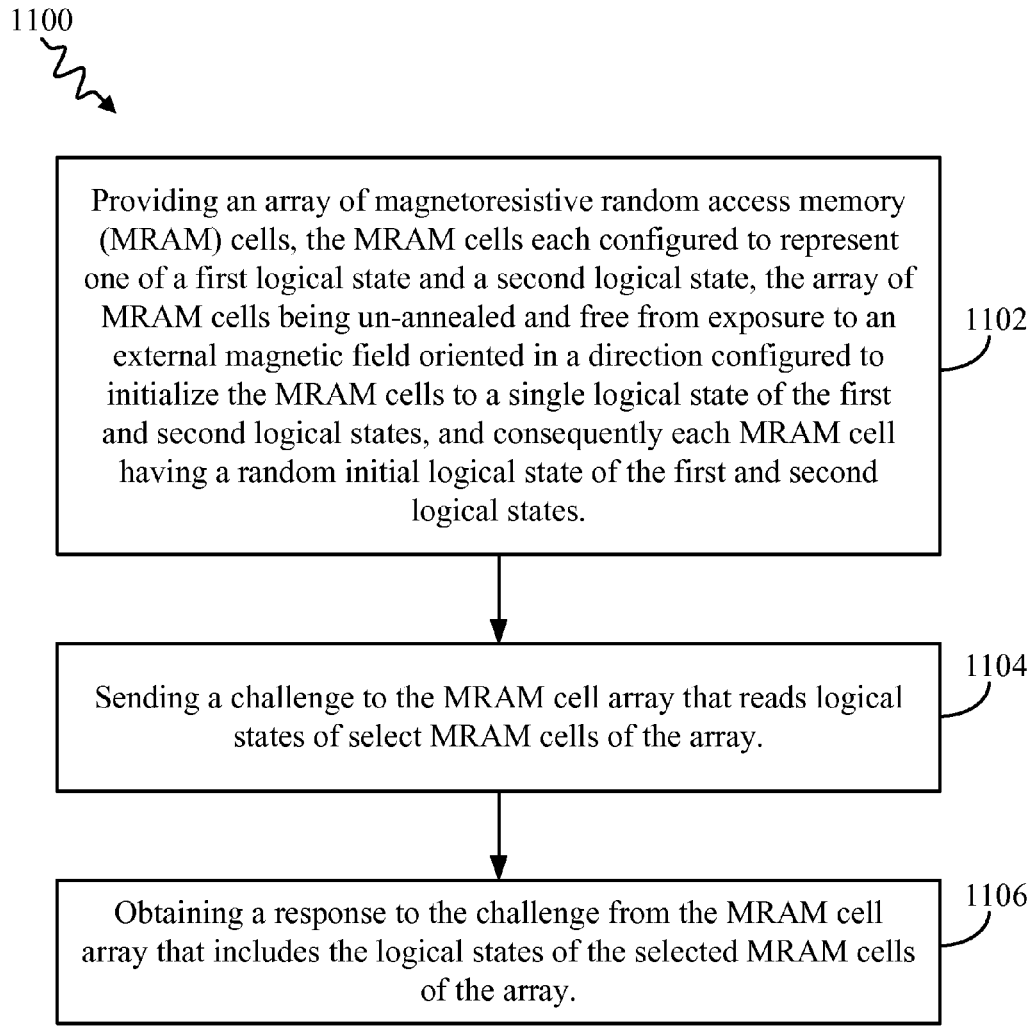
FIG. 11 illustrates a flow diagram of a method for implementing an MRAM based PUF.

FIG. 11 illustrates a flow diagram 1100 of a method for implementing an MRAM based PUF according to one aspect. First, an array of magnetoresistive random access memory (MRAM) cells is provided, the MRAM cells each configured to represent one of a first logical state and a second logical state, and where the array of MRAM cells are un-annealed and free from exposure to an external magnetic field oriented in a direction configured to initialize the MRAM cells to a single logical state of the first and second logical states, which consequently results in each MRAM cell having a random initial logical state of the first and second logical states 1102. Next, a challenge is sent to the MRAM cell array that reads logical states of select MRAM cells of the array 1104. Then, a response to the challenge is obtained from the MRAM cell array that includes the logical states of the selected MRAM cells of the array 1106.

Exemplary Electronic Device

Figure 12:
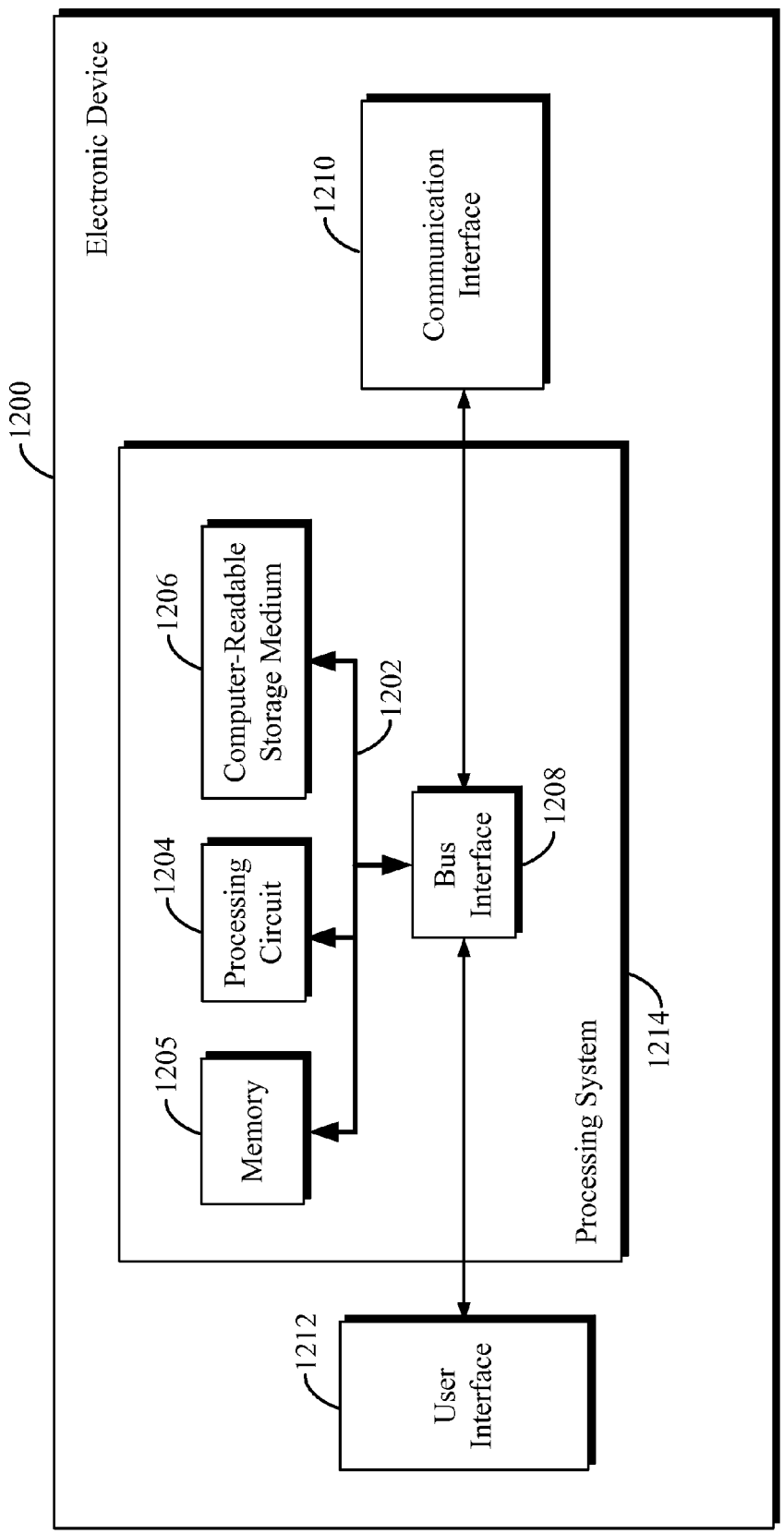
FIG. 12 illustrates an exemplary schematic block diagram of a hardware implementation for an electronic device that includes MRAM based PUFs.

FIG. 12 illustrates an exemplary schematic block diagram of a hardware implementation for an electronic device 1200 that may include the MRAM based PUFs described herein. The electronic device 1200 may be a mobile phone, smartphone, tablet, portable computer, and or any other electronic device having circuitry. The electronic device 1200 may include a communication interface 1210, a user interface 1212, and a processing system 1214. The processing system 1214 may include a processing circuit (e.g., processor) 1204, a memory circuit (e.g., memory) 1205, a computer-readable storage medium 1206, a bus interface 1208, and a bus 1202. The processing system 1214 and/or the processing circuit 1204 may be configured to perform any of the steps, functions, and/or processes described above and also those steps depicted in FIG. 11 and/or described with respect to FIGS. 6, 8, 9, and 10.

The processing circuit 1204 may be one or more processors (e.g., first processor, etc.) that are adapted to process data for the electronic device 1200. For example, the processing circuit 1204 may be a specialized processor, such as an application specific integrated circuit (ASIC) that serves as a means for carrying out any one of the steps described with reference to FIG. 11 and/or described with respect to FIGS. 6, 8, 9, and 10.

Examples of processing circuits 1204 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. The processing circuit 1204 is also responsible for managing the bus 1202, and executing software stored on the computer-readable storage medium 1206 and/or memory 1205. The software, when executed by the processing circuit 1204, causes the processing system 1214 to perform the various functions, steps, and/or processes described above with respect to FIGS. 6, 8, 9, 10, and/or 11. The computer-readable storage medium 1206 may be used for storing data that is manipulated by the processing circuit 1204 when executing software.

The memory circuit 1205 may be non-volatile memory, such as but not limited to FLASH memory, magnetic or optical hard disk drives, etc. The memory circuit 1205 may include the MRAM arrays described herein that are PUFs. For example, a portion of the memory circuit 1205 may be any one of the MRAM based PUFs depicted in FIGS. 6, 7, 8, 9, and/or 10.

Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable storage medium 1206. The computer-readable storage medium 1206 may be a non-transitory computer-readable storage medium. A non-transitory computer-readable storage medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable storage medium 1206 may reside in the processing system 1214, external to the processing system 1214, or distributed across multiple entities including the processing system 1214. The computer-readable storage medium 1206 may be embodied in a computer program product.

In this example, the processing system 1214 may be implemented with a bus architecture, represented generally by the bus 1202. The bus 1202 may include any number of interconnecting buses and bridges depending on the specific application of the processing system 1214 and the overall design constraints. The bus 1202 links together various circuits including one or more processors (represented generally by the processor 1204), a memory 1205, and computer-readable media (represented generally by the computer-readable storage medium 1206). The bus 1202 may also link various other circuits such as timing sources, peripherals, voltage regulators, and power management circuits, which are well known in the art, and therefore, will not be described any further. A bus interface 1208 provides an interface between the bus 1202 and the communication interface 1210 (if present). The communication interface 1210 provides a means for communicating with other apparatus over a transmission medium. Depending upon the nature of the apparatus, a user interface 1212 (e.g., keypad, display, speaker, microphone, touch-screen display, etc.) may also be provided for the electronic device 1200.

Figure 13:
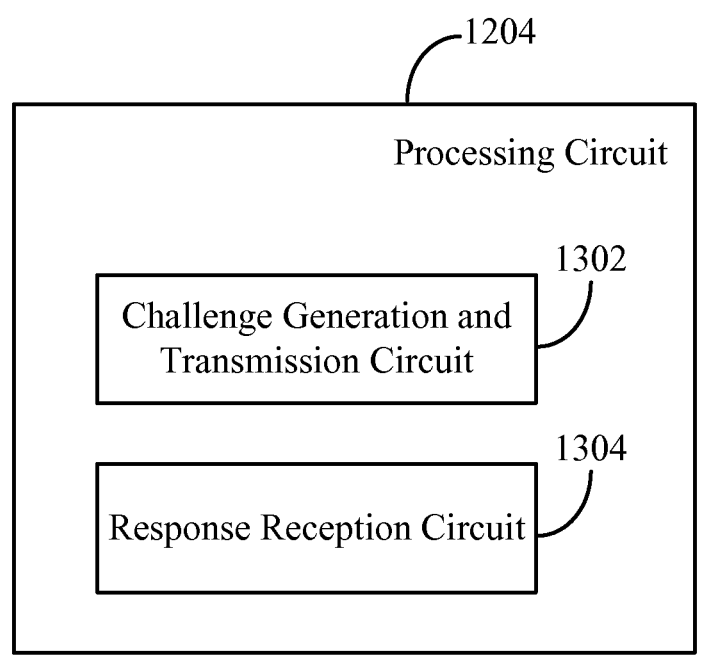
FIG. 13 illustrates a schematic block diagram of the processing circuit of an electronic device having MRAM based PUF(s).

FIG. 13 illustrates a schematic block diagram of the processing circuit 1204 according to one aspect of the disclosure. The processing circuit 1204 may include a challenge generation and transmission circuit 1302 and a response reception circuit 1304. According to one example, the circuits 1302, 1304 may be communicatively coupled to one another through, for example, a bus architecture or through direct electrical wire coupling.

The challenge generation and transmission circuit 1302 may be, according to one example, a hard wired ASIC that is capable of generating and sending a challenge to an MRAM cell array that reads logical states of select MRAM cells of the array. Thus, the challenge generation and transmission circuit 1302 represents at least one example of a means for sending a challenge to an MRAM cell array that reads logical states of select MRAM cells of the array.

The response reception circuit 1304 may be, according to one example, a hard wired ASIC that is capable of obtaining a response to the challenge from an MRAM cell array that includes the logical states of the selected MRAM cells of the array. Thus, the response reception circuit 1304 represents at least one example of a means for obtaining a response to the challenge from an MRAM cell array that includes the logical states of the selected MRAM cells of the array.

One or more of the components, steps, features, and/or functions illustrated in FIGS. 4, 5, 6, 7, 8, 9, 10, 11, 12, and/or 13 may be rearranged and/or combined into a single component, step, feature or function or embodied in several components, steps, or functions. Additional elements, components, steps, and/or functions may also be added without departing from the invention. The apparatus, devices, and/or components illustrated in FIGS. 6, 7, 8, 9, 10, 12, and/or 13 may be configured to perform one or more of the methods, features, and/or steps described in FIG. 11. The algorithms described herein may also be efficiently implemented in software and/or embedded in hardware.

Moreover, in one aspect of the disclosure, the processing circuit 1204 illustrated in FIGS. 12 and 13 may be a specialized processor (e.g., an application specific integrated circuit (e.g., ASIC)) that is specifically designed and/or hard-wired to perform the algorithms, methods, and/or steps described in FIG. 11. Thus, such a specialized processor (e.g., ASIC) may be one example of a means for executing the algorithms, methods, and/or steps described in FIG. 11. The computer-readable storage medium 1206 may also store processor 1204 readable instructions that when executed by a specialized processor (e.g., ASIC) causes the specialized processor to perform the algorithms, methods, and/or steps described in FIG. 11.

Also, it is noted that the aspects of the present disclosure may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, a storage medium may represent one or more devices for storing data, including read-only memory (ROM), random access memory (RAM), magnetic disk storage mediums, optical storage mediums, flash memory devices and/or other machine-readable mediums and, processor-readable mediums, and/or computer-readable mediums for storing information. The terms "machine-readable medium", "computer-readable medium", and/or "processor-readable medium" may include, but are not limited to non-transitory mediums such as portable or fixed storage devices, optical storage devices, and various other mediums capable of storing, containing or carrying instruction(s) and/or data. Thus, the various methods described herein may be fully or partially implemented by instructions and/or data that may be stored in a "machine-readable medium", "computer-readable medium", and/or "processor-readable medium" and executed by one or more processors, machines and/or devices.

Furthermore, aspects of the disclosure may be implemented by hardware, software, firmware, middleware, microcode, or any combination thereof. When implemented in software, firmware, middleware or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The various illustrative logical blocks, modules, circuits, elements, and/or components described in connection with the examples disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing components, e.g., a combination of a DSP and a microprocessor, a number of microprocessors, one or more microprocessors in conjunction with a DSP core, or any other such configuration.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

Those of skill in the art would further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The various features of the invention described herein can be implemented in different systems without departing from the invention. It should be noted that the foregoing aspects of the disclosure are merely examples and are not to be construed as limiting the invention. The description of the aspects of the present disclosure is intended to be illustrative, and not to limit the scope of the claims. As such, the present teachings can be readily applied to other types of apparatuses and many alternatives, modifications, and variations will be apparent to those skilled in the art.

What is claimed is:

1. A method for implementing a physically unclonable function (PUF), the method comprising:
providing an array of magnetoresistive random access memory (MRAM) cells, the MRAM cells each configured to represent one of a first logical state and a second logical state, the array of MRAM cells being un-annealed and free from exposure to an external magnetic field oriented in a direction configured to initialize the MRAM cells to a single logical state of the first and second logical states, and consequently each MRAM cell having a random initial logical state of the first and second logical states;
sending a challenge to the MRAM cell array that reads logical states of select MRAM cells of the array; and
obtaining a response to the challenge from the MRAM cell array that includes the logical states of the selected MRAM cells of the array.

2. The method of claim 1, wherein the MRAM cells lack an anti-ferromagnetic (AFM) pinning layer.

3. The method of claim 1, wherein during manufacture the MRAM cells have been temporarily exposed to an orthogonal external magnetic field oriented in an orthogonal direction to an easy axis of a free layer of the MRAM cells to place the MRAM cells in a neutral logical state that is not the first logical state or the second logical state.

4. The method of claim 3, wherein during manufacture the orthogonal external magnetic field is removed causing the MRAM cells to settle into the random initial logical states.

5. The method of claim 3, wherein the MRAM cells of the array are in-plane MRAM cells, the easy axis is a long axis of the free layer of the MRAM cells, and the orthogonal external magnetic field is oriented in a direction that is parallel to a short axis of the free layer.

6. The method of claim 3, wherein the MRAM cells of the array are in-plane MRAM cells, the easy axis is a long axis of the free layer of the MRAM cells, and the orthogonal external magnetic field is oriented in a direction that is orthogonal to both a short axis of the free layer and the long axis of the free layer.

7. The method of claim 3, wherein the MRAM cells of the array are perpendicular MRAM cells, and the easy axis is a perpendicular axis of the free layer of the MRAM cells.

8. The method of claim 1, wherein the logical states of the MRAM cells of the array serve as a cryptographic key that uniquely identifies an electronic device.

9. The method of claim 1, wherein the logical states of the MRAM cells of the array are utilized by a cryptographic security algorithm.

10. The method of claim 1, wherein the challenge includes MRAM cell address information, and the response includes data bit information of MRAM cells corresponding to the MRAM cell address information.

11. An apparatus for implementing a physically unclonable function (PUF), the apparatus comprising:
an array of magnetoresistive random access memory (MRAM) cells, the MRAM cells each configured to represent one of a first logical state and a second logical state, the array of MRAM cells being un-annealed and free from exposure to an external magnetic field oriented in a direction configured to initialize the MRAM cells to a single logical state of the first and second logical states, and consequently each MRAM cell having a random initial logical state of the first and second logical states; and
a processing circuit communicatively coupled to the array of MRAM cells and configured to
send a challenge to the MRAM cell array that reads logical states of select MRAM cells of the array, and
obtain a response to the challenge from the MRAM cell array that includes the logical states of the selected MRAM cells of the array.

12. The apparatus of claim 11, wherein the MRAM cells lack an anti-ferromagnetic (AFM) pinning layer.

13. The apparatus of claim 12, wherein during manufacture the MRAM cells have been temporarily exposed to an orthogonal external magnetic field oriented in an orthogonal direction to an easy axis of a free layer of the MRAM cells to place the MRAM cells in a neutral logical state that is not the first logical state or the second logical state.

14. The apparatus of claim 13, wherein during manufacture the orthogonal external magnetic field is removed causing the MRAM cells to settle into the random initial logical state.

15. The apparatus of claim 13, wherein the MRAM cells of the array are in-plane MRAM cells, the easy axis is a long axis of the free layer of the MRAM cells, and the orthogonal external magnetic field is oriented in a direction that is parallel to a short axis of the free layer.

16. The apparatus of claim 13, wherein the MRAM cells of the array are in-plane MRAM cells, the easy axis is a long axis of the free layer of the MRAM cells, and the orthogonal external magnetic field is oriented in a direction that is orthogonal to both a short axis of the free layer and the long axis of the free layer.

17. The apparatus of claim 13, wherein the MRAM cells of the array are perpendicular MRAM cells, and the easy axis is a perpendicular axis of the free layer of the MRAM cells.

18. The apparatus of claim 11, wherein the random initial logical states of the MRAM cells of the array are stored in secure memory.

19. The apparatus of claim 11, wherein the logical states of the MRAM cells of the array serve as a cryptographic key that uniquely identifies an electronic device.

20. The apparatus of claim 11, wherein the challenge includes MRAM cell address information, and the response includes data bit information of MRAM cells corresponding to the MRAM cell address information.

21. An apparatus for implementing a physically unclonable function (PUF), the apparatus comprising:
an array of magnetoresistive random access memory (MRAM) cells, the MRAM cells each configured to represent one of a first logical state and a second logical state, the array of MRAM cells being un-annealed and free from exposure to an external magnetic field oriented in a direction configured to initialize the MRAM cells to a single logical state of the first and second logical states, and consequently each MRAM cell having a random initial logical state of the first and second logical states;
means for sending a challenge to the MRAM cell array that reads logical states of select MRAM cells of the array; and
means for obtaining a response to the challenge from the MRAM cell array that includes the logical states of the selected MRAM cells of the array.

22. The apparatus of claim 21, wherein the MRAM cells lack an anti-ferromagnetic (AFM) pinning layer.

23. The apparatus of claim 21, wherein during manufacture the MRAM cells have been temporarily exposed to an orthogonal external magnetic field oriented in an orthogonal direction to an easy axis of a free layer of the MRAM cells to place the MRAM cells in a neutral logical state that is not the first logical state or the second logical state.

24. The apparatus of claim 23, wherein during manufacture the orthogonal external magnetic field is removed causing the MRAM cells to settle into the random initial logical state.

25. The apparatus of claim 21, wherein the logical states of the MRAM cells of the array serve as a cryptographic key that uniquely identifies an electronic device.

26. A non-transitory computer-readable storage medium having instructions stored thereon for implementing a physically unclonable function (PUF), the instructions, which when executed by at least one processor, causes the processor to:
send a challenge to an array of magnetoresistive random access memory (MRAM) cells that reads logical states of select MRAM cells of the array, the MRAM cells each configured to represent one of a first logical state and a second logical state, the array of MRAM cells being un-annealed and free from exposure to an external magnetic field oriented in a direction configured to initialize the MRAM cells to a single logical state of the first and second logical states, and wherein each MRAM cell has a random initial logical state of the first and second logical states; and obtain a response to the challenge from the MRAM cell array that includes the logical states of the selected MRAM cells of the array.

27. The non-transitory computer-readable storage medium of claim 26, wherein the MRAM cells lack an anti-ferromagnetic (AFM) pinning layer.

28. The non-transitory computer-readable storage medium of claim 26, wherein during manufacture the MRAM cells have been temporarily exposed to an orthogonal external magnetic field oriented in an orthogonal direction to an easy axis of a free layer of the MRAM cells to place the MRAM cells in a neutral logical state that is not the first logical state or the second logical state.

29. The non-transitory computer-readable storage medium of claim 28, wherein during manufacture the orthogonal external magnetic field is removed causing the MRAM cells to settle into the random initial logical state.

30. The non-transitory computer-readable storage medium of claim 26, wherein the logical states of the MRAM cells of the array serve as a cryptographic key that uniquely identifies an electronic device.

\* \* \* \* \*